US012008919B2

United States Patent
Lurie et al.

(10) Patent No.: US 12,008,919 B2
(45) Date of Patent: Jun. 11, 2024

(54) COMPUTER ASSISTED LINGUISTIC TRAINING INCLUDING MACHINE LEARNING

(71) Applicant: International Business Machines Corporation, Armonk, NY (US)

(72) Inventors: Lisa Beth Lurie, New York, NY (US); Steven Ware Jones, Astoria, NY (US); Jennifer A. Mallette, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 17/116,302

(22) Filed: Dec. 9, 2020

(65) Prior Publication Data

US 2022/0180762 A1 Jun. 9, 2022

(51) Int. Cl.
*G09B 5/04* (2006.01)
*G10L 15/22* (2006.01)
*G10L 21/003* (2013.01)
*G10L 25/51* (2013.01)

(52) U.S. Cl.
CPC ............... *G09B 5/04* (2013.01); *G10L 15/22* (2013.01); *G10L 21/003* (2013.01); *G10L 25/51* (2013.01)

(58) Field of Classification Search
CPC .. G09B 5/04; G09B 5/00; G10L 15/22; G10L 21/003; G10L 25/51; G10L 21/00
See application file for complete search history.

(56) References Cited

U.S. PATENT DOCUMENTS

| | | | |
|---|---|---|---|
| 6,847,714 B2 | 1/2005 | Das | |
| 7,593,849 B2 | 9/2009 | Das | |
| 8,175,882 B2 | 5/2012 | Basson | |
| 10,319,369 B2 | 6/2019 | Cassagne | |
| 2018/0174595 A1* | 6/2018 | Dirac | .................... G10L 15/005 |
| 2018/0268728 A1* | 9/2018 | Burdis | ..................... G09B 7/04 |

(Continued)

FOREIGN PATENT DOCUMENTS

KR 20200044285 A 4/2020

OTHER PUBLICATIONS

"Actor Learns a Boston Accent in 6 Hours", Vanity Fair—YouTube, Aug. 13, 2019, 1 page, <https://www.youtube.com/watch?v=qaZG2mqiQog>.

(Continued)

*Primary Examiner* — Timothy A Musselman
(74) *Attorney, Agent, or Firm* — Michael A. Petrocelli

(57) ABSTRACT

A computer assists in training a user to speak with a target accent by determining improvable aspects of diagnostic input of a user speaking diagnostic phrases with the target accent. The computer selects, a focus phrase characterized by at least one of said improvable aspects. The computer records performance input of the user attempting to say the focus phrase in the target accent. The computer converts the performance input into output having a baseline voice of the and the target accent applied. The computer presents the output and determines teachable aspects of revised performance input from the user replicating the output. The computer converts selected aspects of the revised performance input into augmented teaching output in the user's voice with the target accent applied. The computer presents the augmented teaching output to the user.

20 Claims, 9 Drawing Sheets

(56) References Cited

U.S. PATENT DOCUMENTS

2019/0333499 A1* 10/2019 Li .................. G10L 15/1822

OTHER PUBLICATIONS

"Boston accent", Wikipedia, last edited on Dec. 2, 2020, 9 pages, <https://en.wikipedia.org/wiki/Boston_accent>.
"What languages in Europe have the most or least phonemes ?", eupedia.com, 5 pages, <https://www.eupedia.com/linguistics/number_of_phonemes_in_european_languages.shtml>.
Bearman, et al., "Accent Conversion Using Artificial Neural Networks", Semantic Scholar, Published 2017, Abstract Only, 1 page, <https://pdfs.semanticscholar.org/e362/207b67aa1f6dbf5ea2d9e01edeeda70ba15e.pdf>.
Ding, et al., "Accent conversion", PSI Lab, last printed Dec. 8, 2020, 10 pages, <https://psi.engr.tamu.edu/portfolio/accent-conversion/>.
Mell, et al., "The NIST Definition of Cloud Computing", National Institute of Standards and Technology, Special Publication 800-145, Sep. 2011, 7 pages.

* cited by examiner

COMPUTER ASSISTED LINGUISTIC TRAINING INCLUDING MACHINE LEARNING

BACKGROUND

The present invention relates generally to the field of machine assisted linguistics training and, more specifically, to machine assistance for providing customized linguistic instruction.

Leaning to speaking a language other than one's native language can be challenging. In addition to learning linguistic building blocks such as grammar, vocabulary, and syntax, one may also strive to replicate the accent of native speakers when learning to speak a new language. Without attention to developing an appropriate accent, even speakers with a command of grammar, vocabulary, and syntax may sound as though they are not familiar with a newly-learned language.

Learning to speak with an accepted accent when learning a language can be difficult. Although many aspects of a new language can be learned through memorization of vocabulary and linguistic rules, speaking consistently with an accent associated with a newly-learned language can be difficult skill to develop. Although some language instruction systems provide accent development guidance, these systems typically use generalized reference models that are often ineffective. Depending on user skill, imitation of standardized reference targets may be difficult. In some situations, depending on a user's own natural acoustic tendencies, expecting a user to mimic generalized output models is unrealistic and can actually slow a learner's progress.

Language instruction systems that use normalized instruction models are effective at teaching grammar, syntax, and vocabulary, but may provide inadequate pronunciation training for many users.

SUMMARY

According to one embodiment, a computer-implemented method to train a user to speak with a target accent, includes determining, by the computer, improvable aspects of diagnostic input, received at the computer, the diagnostic input representing a user speaking diagnostic phrases with a target accent. The computer selects, from a corpus of reference audio phrases received at the computer from a reference audio source, a focus phrase characterized by at least one of the improvable aspects, the focus phrase being selected, in accordance at least in part, with a learnability score calculated by the computer, using a deep learning ML model trained to assess, for the user, learning difficulty of the improvable aspects. The computer receives from an input source performance input representing the user speaking the focus phrase attempting to use the target accent. The computer converts the performance input into augmented focus output having audio attributes of a baseline voice of the user with the target accent applied and presents the augmented focus output to the user. Responsive to said presentation, the computer receives, from an input source, revised performance input representing the user attempting to replicate the augmented focus output, and determines teachable aspects of the revised performance input. The computer converts selected teachable aspects of the revised performance input into augmented teaching output having at least one audio attribute of a baseline voice of the user with the target accent applied, and presents the augmented teaching output to the user. According to aspects of the invention, the computer receives an accent assessment speech sample from a speech sample source, representing a user speaking in one of a predetermined set of accents. The computer determines a baseline accent for the user by using a machine learning (ML) accent identification model (AIM) trained to classify the accent assessment speech sample as having one of said predetermined set of accents; and the learnability score is based, at least partially, on a characteristic selected from a list consisting of the baseline accent and a user performance history of speaking said improvable aspects. According to aspects of the invention, when the learnability score is chosen in accordance with said baseline accent, the learnability score represents learning difficulty of the improvable aspects for users having the baseline accent and attempting to learn the target accent. According to aspects of the invention, the focus phrase is characterized by a plurality of improvable attributes identified by the computer, using an ML model trained to determine a difficulty correlation between multiple attributes, as having a learnability score in a predetermined training range. According to aspects of the invention, conversion of at least one of either the performance input or selected teachable aspects of the revised performance input is accomplished by the computer using an ML Accent Conversion Model (ACM) trained to convert an audio input into an audio output having the target accent. According to aspects of the invention, the determination of at least one of either the improvable aspects or teachable aspects is made responsive to the computer using the ACM to convert audio input of the user into an accent-corrected audio file characterized by the target accent and determining a similarity value indicating an amount of processing needed to convert the audio input into the accent-corrected audio file. According to aspects of the invention, the plurality of reference audio phrases includes at least one phrase provided by the user.

According to another embodiment system to train a user to speak with a target accent, includes: a computer system comprising a computer readable storage medium having program instructions embodied therewith, the program instructions executable by a computer to cause the computer to: determine improvable aspects of diagnostic input, received at the computer, the diagnostic input representing a user speaking diagnostic phrases with a target accent; select from a corpus of reference audio phrases received at the computer from a reference audio source, a focus phrase characterized by at least one of said improvable aspects, said focus phrase being selected, in accordance at least in part, with a learnability score calculated, by said computer, using a deep learning ML model trained to assess, for the user, learning difficulty of the improvable aspects; receiving from an input source, performance input representing the user speaking the focus phrase attempting to use the target accent; convert the performance input into augmented focus output having audio attributes of a baseline voice of the user with the target accent applied, and presenting the augmented focus output to the user; responsive to said presentation, receiving from an input source revised performance input representing the user attempting to replicate the augmented focus output, and determining by said computer, teachable aspects of said revised performance input; and convert selected teachable aspects of the revised performance input into augmented teaching output having at least one audio attribute of a baseline voice of the user with the target accent applied, and presenting the augmented teaching output to the user.

According to another embodiment, a computer program product to train a user to speak with a target accent, the computer program product comprising a computer readable storage medium having program instructions embodied therewith, the program instructions executable by a computer to cause the computer to: determine, using a computer, improvable aspects of diagnostic input, received at the computer, the diagnostic input representing a user speaking diagnostic phrases with a target accent; select, using the computer, from a corpus of reference audio phrases received at the computer from a reference audio source, a focus phrase characterized by at least one of said improvable aspects, said focus phrase being selected, in accordance at least in part, with a learnability score calculated, by said computer, using a deep learning ML model trained to assess, for the user, learning difficulty of the improvable aspects; receiving from an input source, using the computer, performance representing of the user speaking the focus phrase attempting to use the target accent; convert, using the computer, the performance input into augmented focus output having audio attributes of a baseline voice of the user with the target accent applied, and presenting the augmented focus output to the user; responsive to said presentation, receiving from an input source revised performance input representing the user attempting to replicate the augmented focus output, and determining by said computer, teachable aspects of said revised performance input; and convert, using the computer, selected teachable aspects of the revised performance input into augmented teaching output having at least one audio attribute of a baseline voice of the user with the target accent applied, and presenting the augmented teaching output to the user.

The present disclosure recognizes the shortcomings and problems associated with training a user to speak in a target accent without providing training material in a voice that is recognizable to the user and without considering the baseline accent of the user when prioritizing a presentation order of materials provided to the user.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
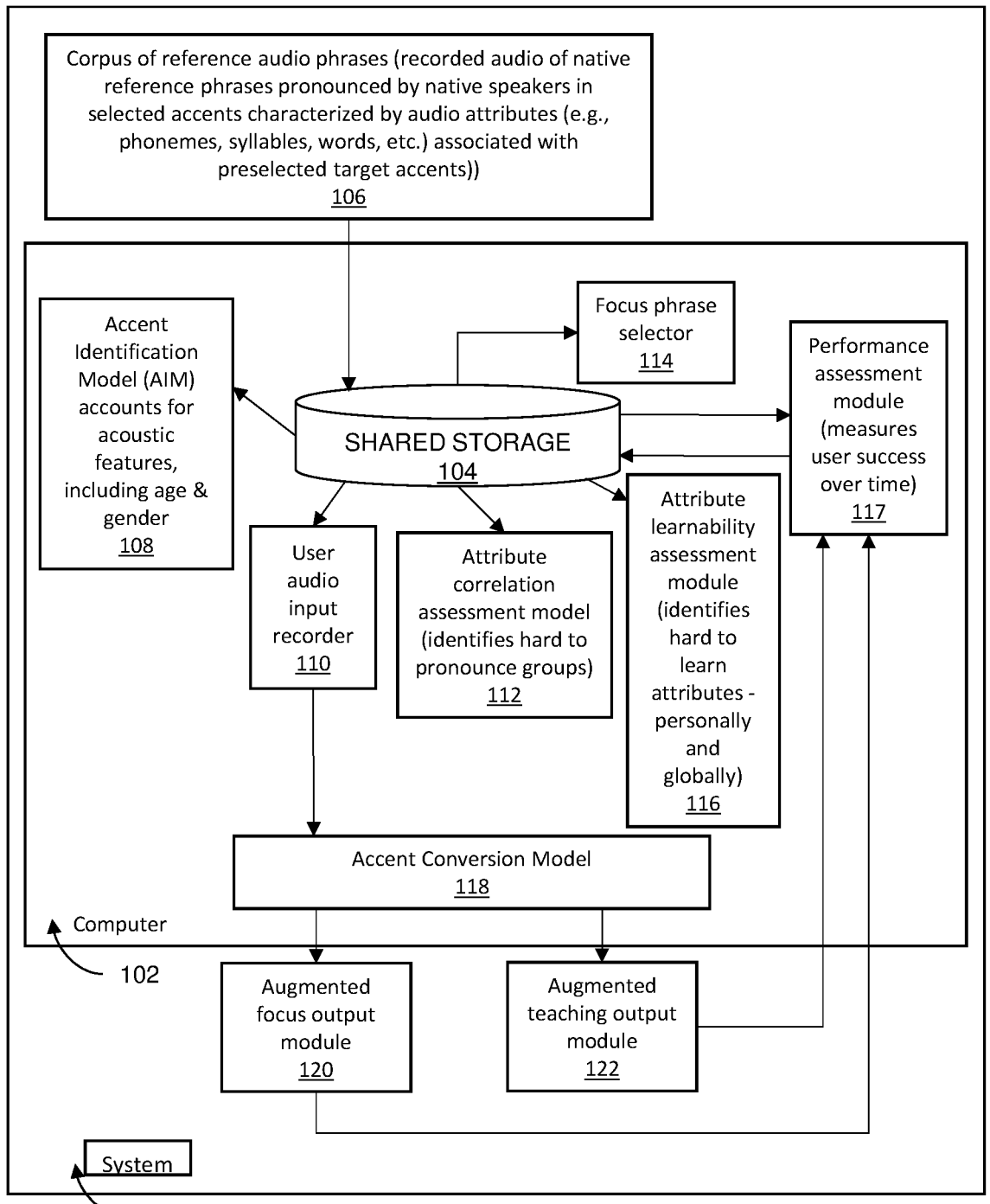
FIG. 1 is a schematic block diagram illustrating an overview of a system for computer-implemented method to teach a user how to speak in a target accent by presenting strategically-selected phrases in the user's own voice, with the target accent applied according to embodiments of the present invention.
Figure 2:
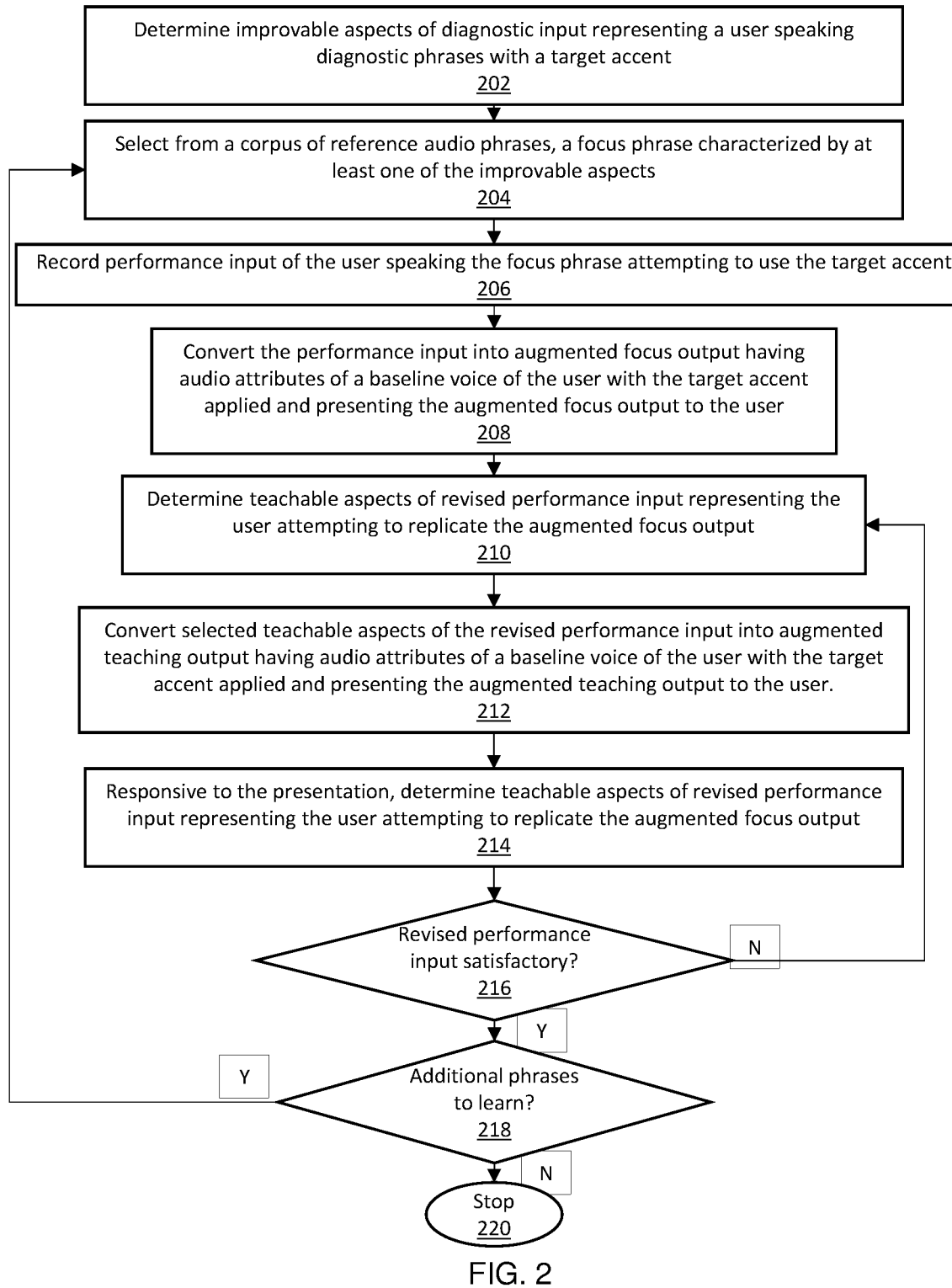
FIG. 2 is a flowchart illustrating a method, implemented using the system shown in FIG. 1, of teaching a user how to speak in a target accent by presenting strategically-selected phrases in the user's own voice, with the target accent applied according to aspects of the invention.

Now with combined reference to the Figures generally and with particular reference to FIG. 1 and FIG. 2, an overview of a method to teach a user how to speak in a target accent by presenting strategically-selected phrases in the user's own voice, with the target accent applied usable within a system 100 as carried out by a server computer 102 having optionally shared storage 104, according to an embodiment of the present disclosure is shown. In one example, the server computer 102 is operative communication with a corpus of reference audio phrases 106. According to aspects of the invention, the reference phrases are recorded in selected accents and are characterized by audio attributes (e.g., phonemes, syllables, words, etc.) associated with the accents, at a minimum covering all the phonemes (e.g., unique sounds for the represented language) in various target dialects. In one embodiment, the phrases collectively represent a very large data set of people speaking common phrases in English that cover all the target phonemes (e.g., English-with-a-Scottish-accent, English-with-an-American-accent, English-with-a-Singapore-accent, English with a Southern accent, etc.) It is noted that other languages and associated dialects may be selected in the judgment of one skilled in this field. The server computer 102 includes an Accent Identification Model (AIM) 108 that accounts for acoustic features, including age & gender, and identifies one of several preselected target accents. In one example, the AIM 108 is a deep learning machine learning model trained to recognize spoken audio having English-with-a-Scottish-accent, English-with-an-American-accent, English-with-a-Singapore-accent, and English with a Southern accent. AIM 108 may also be trained to recognize other accents in accordance with the judgment of one skilled in this field. In embodiments of the invention, the AIM 108 is trained to identify phonemes in a plurality of dialects (e.g., local accents) and is tailored to identify within the spoken language acoustic features of a speaker, including age and gender.

The server computer 102 includes a user audio input recorder 110 that allows the computer to receive and store audio (e.g., such as spoken voice input), as needed for aspects of the present invention. According to aspects of the invention, the server computer 102 generates diagnostic phrase scores by recording the user (e.g. with the input recorder 110) speaking diagnostic phrases, mapping the recorded phrases into the acoustic space of a native speaker for the target accent (e.g., as stored in the corpus of reference audio phrases 106), and comparing the adjusted recorded input to the associated reference phrase. It is noted that scores are more accurate when compared phrases are adjusting for varying recorded vocal tract length to match phrase length of reference materials in the corpus 106. According to aspects of the invention, the server computer 102 determines acoustic similarity scores (an overall phrase score and individual phoneme scores) for each diagnostic phrase spoken by a user. Based on these acoustic similarity scores (e.g., 0=strong dissimilarity with target accent, 1=strong similarity with target accent), the server computer 102, determines troublesome phonemes. The server computer 102 includes Performance Assessment Module (PAM) 117 that identifies user progress with troublesome sounds over time. According to aspects of the invention, PAM 117 is a deep machine learning system that is continuously, incrementally, or otherwise iteratively trained on a user's progress. During system use, the PAM 117 records historic acoustic similarity scores and coordinates with a Focus Phrase Selector (FPS) 114 to ensure phrases with troublesome sounds and phonemes (e.g., teachable attributes) are presented to the user. According to aspects of the invention, the FPS 114 cooperates with the PAM 117 identifies and prioritizes problem areas within the teachable attributes and presents these prioritized (e.g., improvable) aspects of a target accent to the user. In particular, according to aspects of the invention, the PAM 117 analyzes these scores (e.g., phrase, phoneme, and learnability scores), identifies a set of teachable aspects (e.g., phonemes, words, syllables, or other similar audio components) not pronounced correctly by the user, and generates a ranked list of focus phrases for the user to learn. The PAM passes this information to the FPS 114 which selects focus phrases in an order predicted to enhance interactive learning for the user.

It is noted that some phonemes are harder for some users to pronounce than others; this can be based on a variety of causes, including individual user aptitude and baseline accent tendencies a user has when attempting to learn another accent. The server computer 102 includes an Attribute Learnability Assessment Module ALAM 116 that identifies these hard to learn phonemes and determines a relative learnability score for phonemes (or other similar audio attributes) identified as difficult to learn sounds. In particular, the ALAM 116 is a machine learning model (e.g., such as a recurrent neural network or other machine learning (ML) model selected by one in this field) trained to determine the learnability of individual phonemes by considering user performance data generated by PAM 117. It is noted that generate data for single or multiple users. To keep up with changing user pronunciation skills, the ALAM 116 cooperates with PAM 117 to identify currently appropriate focus phrases for the user. The FPS 114 then selects focus phrases containing these teachable attributes (e.g., phoneme) for users to practice. It is noted that selected focus phrases may be chosen to include a mix of phonemes for which a user has varying degrees of proficiency. Thus, aspects of the server computer 102 can be trained to select only certain focus phrases (e.g., the FPS 116) or to correct only certain phonemes (e.g., the ACM 118) when presenting particularly complicated words or phrases as training output. For example, according to aspects of the invention, the server computer 102 may not convert all teachable attributes within a given focus phrase training when generating augmented teaching output, because providing too many attributes at one time may overwhelm some users. According to aspects of the invention, after many rounds of iterative training, the PAM 117 will have sufficient data of users (e.g., users with a particular baseline, or native accent) learning a target accent, and the associated ALAM 116 will be able to identify cross-user correlations. For example, the ALAM 116 may determine that is likely when a speaker with an American accent learns to speak in a Spanish accent, that user will have trouble producing a "rolling r" sound. The PAM 117 could identify which sounds take particular users longer to learn (e.g., the PAM may identify time-to-learn aspects of certain phonemes for various users). According to aspects of the invention, the specific user learnability observations can be aggregated to train the ALAM 116 to identify that particular phrases or phonemes are difficult to say using the target accent, regardless of user baseline accent.

The server computer 102 includes an Attribute Correlation Assessment Model (ACAM) 112 that identifies hard to pronounce groups of phonemes within the diagnostic phrases. The ACAM 112 addresses the concept that a given user may have trouble certain phonemes if there are other difficult phonemes in the same word/sentence. For some users, certain combinations of sounds may be difficult to pronounce, even though the sounds might be easy to pronounce individually. The ACAM 112 calculates correlation values (indicating troublesome sound combinations for the current user) to predict which groups of teachable aspects have a learnability score within a target range appropriate for the current performance of the active user. According to aspects of the invention, the ACAM 112 is a deep learning model (e.g., such as a recurrent neural network or other machine learning (ML) model selected by one in this field) trained to identify phoneme correlations (e.g., to identify a coefficient of determination "R-squared correlation" values above a phoneme correlation threshold of 0.85 or other value selected by one skilled in this field) within user performance for phrases or words where the presence of two particular phonemes within a single phrase results in a low score for one of the phonemes. If multiple difficult phonemes for a particular baseline accent are present, FPS 114 could be configured to initially avoid selecting focus phrases with these phonemes to aid user learning pace.

The server computer 102 includes an Accent Conversion Model 118 that uses known audio conversation techniques to convert user input into accent-corrected output. According to aspects of the invention, the ACM 118 generates accent-corrected versions of the user's baseline recorded voice with the audio characteristics of the target accent applied. That is, the ACM allows the user to hear selected teachable aspects of training phrases in his or her own voice, with the target accent applied. More particularly, the ACM 118 cooperates with Augmented Focus Output Module (AFOM) 120 to present to the user during early assessment rounds as augmented focus output (e.g., the user speaking selected focus phrases) augmented versions (e.g., converted to attributes of the target accent applied) of the user's voice recorded while speaking the focus phrases. An indication of user performance is passed from the AFOM 120 to PAM 117. During continued use, the ACM 118 also cooperates with Augmented Teaching Output Module (ATOM) 122 to present to the user, as ongoing augmented (e.g., converted to attributes of the target accent applied) teaching output, strategically-selected portions of recorded user input. For example, in some embodiments, the ATOM 122 system might only present partially-augmented output in scenarios where a user has failed multiple times to correctly pronounce a full focus phrase in the target accent with all improvable phonemes present. According to aspects of the invention, the ATOM 122 presents to a user augmented teaching output with a mix of baseline user voice and accent-corrected user voice selected to help the user focus on learnable subject matter. An indication of user performance is passed from the ATOM 122 to PAM 117.

Now with reference to FIG. 2, a is a flowchart illustrating a method, implemented using the system shown in FIG. 1, of teaching a user how to speak in a target accent by presenting strategically-selected phrases in the user's own voice, with a target accent applied according to aspects of the invention will be discussed. The server computer 102 determines improvable aspects of user diagnostic input representing a user speaking diagnostic phrases with a target accent. According to aspects of the invention, the server computer 102 makes this determination by directing the user to say a number of diagnostic phrases while attempting to apply a selected target accent (e.g., English with a Scottish accent) and comparing target-accent-identifying attributes (e.g., phonemes, etc.) of user input recorded in user audio input recorder 110 to corresponding accent-identifying attributes in target-reference versions of the same diagnostic phrases stored in the corpus of reference audio phrases 106. The server computer 102 determines, via the ACM 118 how much conversion is necessary for the user diagnostic input to match the reference version of the diagnostic phrase. The server computer 102 computes a dimensionless acoustic similarity score in a manner selected according to the judgment of one skilled in this field that represents this determined conversion amount. According to aspects of the invention, the computed similarity scores will be valued between 0.0 and 1.0, with scores below 0.7 being below a proficiency threshold. Attributes of the diagnostic input with similarity scores below this threshold are determined by the server computer 102 to be improvable aspects of the target accent for the user to learn. Acoustic attributes (e.g., entire phrases, phonemes, phoneme groups, etc.) characterized by similarity scores below 0.5 represent attributes that may be especially troublesome for a given user to learn. According to aspects of the invention, acoustic attributes characterized by similarity scores above 0.5 and below 0.7 are within a range predetermined to be suitable for training.

The server computer 102 selects, based on similarity and learnability scores, via Focus Phrase Selector 114 in block 204, from the corpus of reference audio phrases 106, a focus phrase characterized by at least one of the improvable aspects. The server computer 102 records, via user audio input recorder 110 at block 206, performance input of the user speaking the focus phrase, while attempting to use the target accent.

The server computer 102, converts via Accent Conversion Model 118 in block 208, the recorded user performance input into augmented focus output having audio attributes of a baseline voice of the user with the target accent applied. The server computer 102 presents, via AFOM 120, this augmented focus output to the user as a reference for the user to hear his or her own voice speaking the focus phrase with the target accent applied. The server computer 102 directs the user to repeat the focus phrase after hearing the augmented focus output (e.g., the focus phrase spoken in his or her own accent-corrected voice) and records this input as revised user performance input with the user audio input recorder 110.

The server computer 102 determines teachable aspects of the revised performance input (e.g., recorded input of the user attempting to replicate the augmented focus output) via Accent Conversion Model 118 in block 210. According to aspects of the invention, the server computer 102 computes a dimensionless acoustic similarity score for the revised user performance input in a manner selected according to the judgment of one skilled in this field that represents this determined conversion amount. According to aspects of the invention, the computed similarity score will be valued between 0.0 and 1.0, with scores below 0.7 being below a proficiency threshold. Attributes of the revised performance input with similarity scores below this threshold are determined by the sever computer 102 to be teachable aspects of the revised performance input for the user to learn during ongoing training, until an acceptable level of proficiency (e.g., a calculated similarity score greater than 0.7 is reached).

The server computer 102 converts, via Accent Conversion Model 118 in block 212 selected teachable aspects of the revised performance input into augmented teaching output having audio attributes of a baseline voice of the user with the target accent applied and presenting the augmented teaching output to the user. According to aspect of the invention, the server computer 102 selects, in block 214, teachable aspects for ongoing user training in a manner predicted to promote user learning. According to aspects of the invention, the ALAM 116 will present via ATOM 122 revised augmented teaching output (e.g., partially-accent-corrected versions of the speaker's voice having only strategically-selected teachable aspects presented in an accent-corrected format) to the user and direct the user to replicate the augmented teaching output to gauge performance. The user can then be asked to practice accent corrected phrases or sentences with the highest desired score below a certain threshold. For example, the user may be directed to practice phrases that are close to a proficiency threshold. Alternatively, if progress (as measured by the PAM 117) has slowed, the user could be directed to focus on attributes with lower learnability or similarity scores. For example, the user might want to practice the phrases they are predicted as easy to pronounce for that user to regain confidence after a period of struggle.

The server computer 102 determines, in block 216, whether the revised user performance (e.g., as measured by similarity scores determined as described above) is above a proficiency threshold for the current focus phrase. If the user is able to proficiently pronounce a current focus phrase in the target accent, processing is passed to block 218 where the server computer 102 determines whether additional phrases exist for training. If performance is not proficient, flow is retuned to block 210, where teachable aspects for currently-suitable for ongoing training are selected. According to aspects of the invention, if additional phrases to learn (e.g., corpus phrases with teachable aspects) exist, flow returns to block 204 and iterative training continues until the server computer 102 determines at block 218 that no additional teachable phrases are available, and flow stops at block 220.

Figure 3:
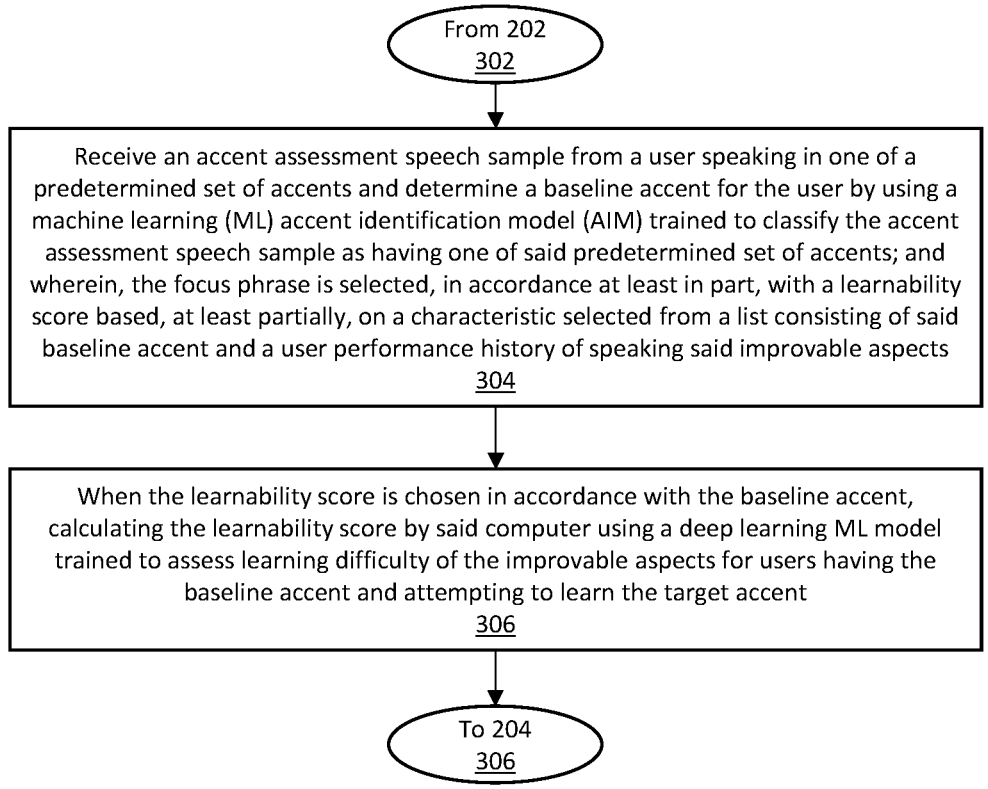
FIG. 3 is a flow diagram showing selected aspects of an embodiment of the method of the present invention.

Now with reference to FIG. 3, a flow diagram showing selected aspects of an embodiment of the method of the present invention will be described. According to one embodiment, the server computer receives, at block 304 an accent assessment speech sample from a user speaking in one of a predetermined set of accents and determines a baseline accent for the user by using the AIM to classify the accent assessment speech sample as having one of said predetermined set of accents, and the focus phrase is selected, in accordance at least in part, with a learnability value chosen, at least partially, from a list consisting of said baseline accent and a user performance history of speaking said improvable aspects. According to aspects of the invention, when the learnability score is chosen in accordance with the baseline accent, the server computer calculates, at block 306, the learnability score by using the a deep learning ML model (e.g., ALAM 116) trained to assess learning difficulty of the improvable aspects for users having the baseline accent and attempting to learn the target accent. According to aspects of the invention, the server computer 102, recognizes the accent of the non-native as one of a group of accents the AIM is trained to recognize. According to aspects of the invention, the AIM 108 is trained to recognize all anticipated user accents. If the AIM 108 is not able identify the use baseline accent, the user is notified of such condition, and the user is given an opportunity to have the model retrained as needed.

Figure 4:
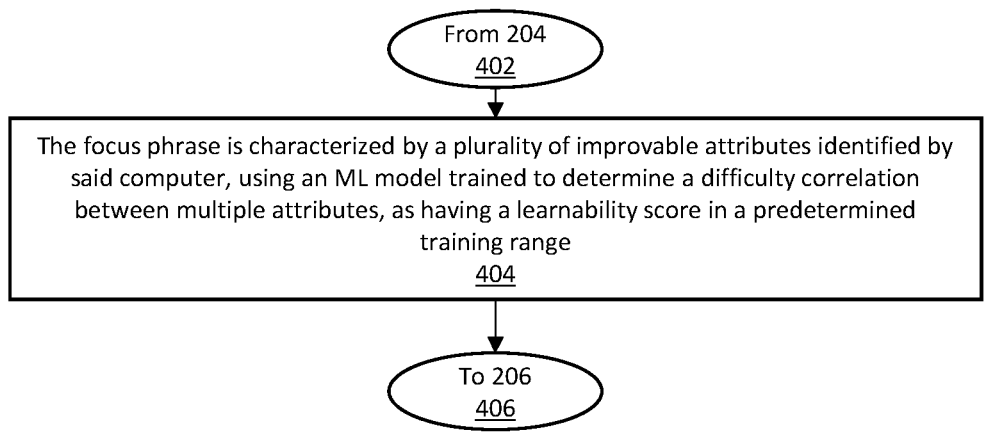
FIG. 4 is a flow diagram showing selected aspects of an embodiment of the method of the present invention.

Now with reference to FIG. 4, a flow diagram showing selected aspects of an embodiment of the method of the present invention will now be described. According to one embodiment of the invention, the focus phrase is characterized by a plurality of improvable attributes identified by the server computer 102, using at block 404, an ML model trained to determine a difficulty correlation between multiple attributes (e.g., ACAM 112), as having a learnability score in a predetermined training range.

Figure 5:
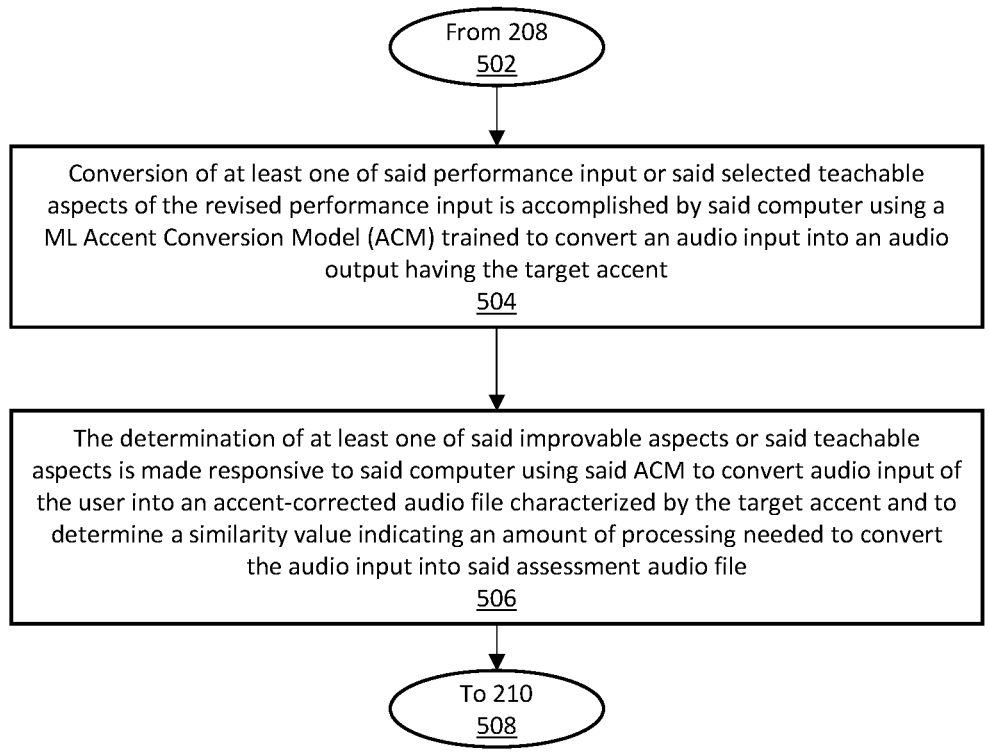
FIG. 5 is a flow diagram showing selected aspects of an embodiment of the method of the present invention.

Now with reference to FIG. 5, a flow diagram showing selected aspects of an embodiment of the method of the present invention will now be described. According to one embodiment of the invention, the server computer 102 converts, at block 504, at least one of either the performance input or the selected teachable aspects of the revised performance input is accomplished by said computer using a ML Accent Conversion Model (ACM) trained to convert an audio input into an audio output having the target accent. According to some aspects of the invention, the determination of at least one of either the improvable aspects or the teachable aspects is made, at block 506, responsive to the computer using the ACM 118 to convert audio input of the user into an accent-corrected audio file characterized by the target accent and to determine a similarity value indicating an amount of processing needed to convert the audio input into the accent-corrected audio file.

Figure 6:
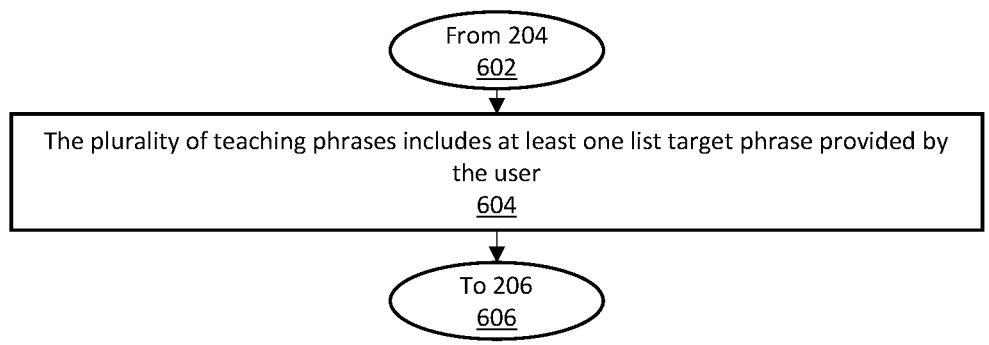
FIG. 6 is a flow diagram showing selected aspects of an embodiment of the method of the present invention.

Now with reference to FIG. 6, a flow diagram showing selected aspects of an embodiment of the method of the present invention will now be described. According to one embodiment of the invention, the plurality of teaching phrases includes at least one list target phrase provided by the user. This arrangement allows a user (e.g., such as an actor or other orator) to practice customized phrases based upon their desired threshold level of accuracy and learning needs. The user-provided phrases could include, for example, material from a script, speech, or other similar material to be rehearsed.

Figure 7:
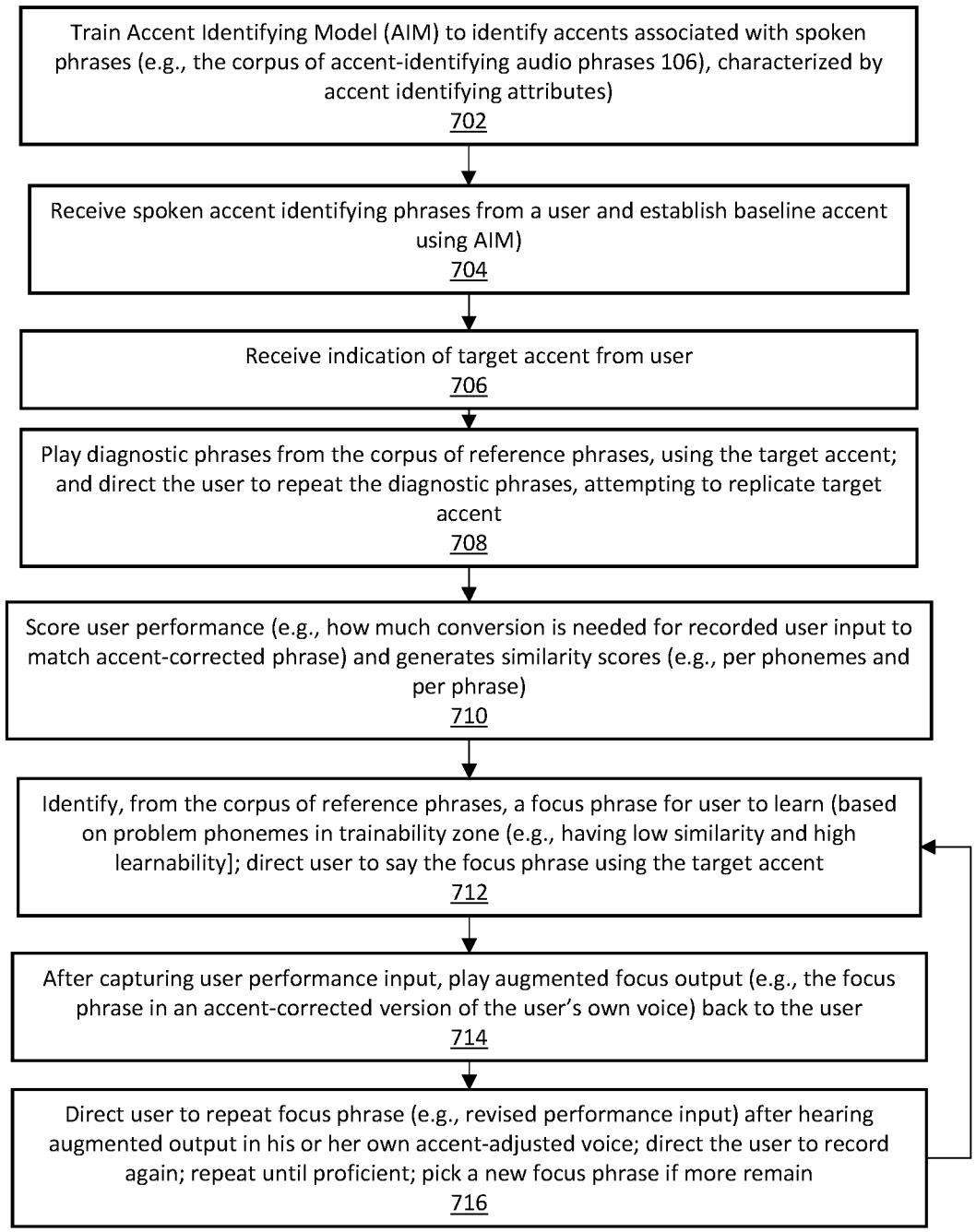
FIG. 7 is a flow diagram showing selected aspects of an embodiment of the method of the present invention.

Now with reference to FIG. 7, a flow diagram showing selected aspects of an embodiment of the method of the present invention will now be described. The server computer 102, at block 702, trains Accent Identifying Model 108 to identify accents associated with spoken phrases (e.g., the corpus of accent-identifying audio phrases 106), characterized by accent identifying attributes. The server computer 102 at block 704 receives spoken accent identifying phrases from a user and identifies a user baseline accent using AIM 108. The server computer 102 receives, at block 706, and indication of a target accent from user. The server computer 102, at block 708, play diagnostic phrases from the corpus of reference phrases 106, using the target accent and direct the user to repeat the diagnostic phrases, attempting to replicate target accent. The server computer 102, at block 710, scores user performance (e.g., how much conversion is needed for recorded user input to match accent-corrected phrase) and generates similarity scores (e.g., per phonemes and per phrase). The server computer 102 at block 712 identifies, from the corpus of reference phrases 106, a focus phrase for user to learn (based on problem phonemes in trainability zone (e.g., having low similarity and high learnability)), and direct the user to say the focus phrase using the target accent. The server computer 102 at block 714, after capturing user performance input, play augmented focus output (e.g., the focus phrase in an accent-corrected version of the user's own voice) back to the user. The server computer 102, at block 716, directs the user to repeat focus phrase (e.g., revised performance input) after hearing augmented output in his or her own accent-adjusted voice. The server computer 102 then directs the user to record the focus phrase again. The server computer 102 iterates this training loop until the user is proficient at speaking the focus phrase with the target accent. When the user is proficient with the current focus phrase, the server computer 102 will pick, at block 712, a new focus phrase for training, if more remain.

Figure 8:
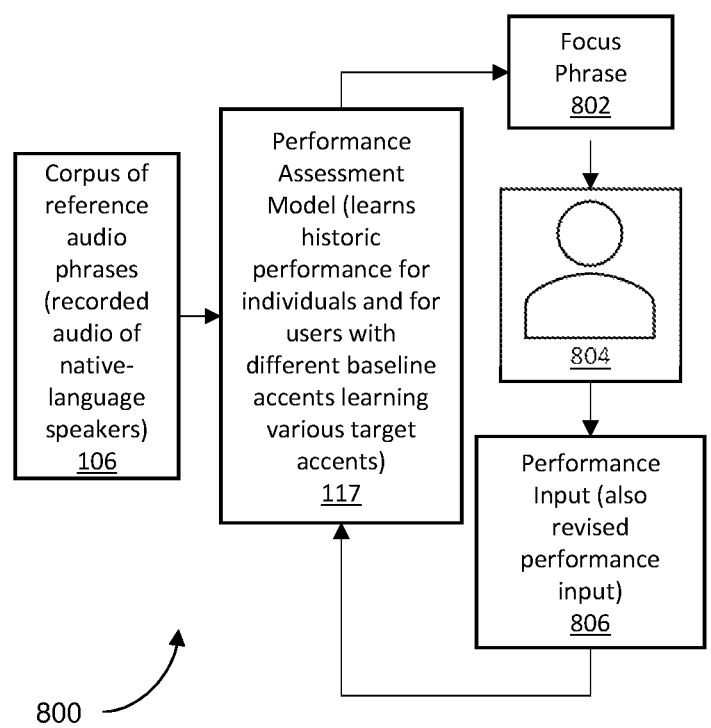
FIG. 8 is a schematic representation of a deep learning feedback loop according to aspects of the present invention.

Now with reference to FIG. 8, a schematic representation of a deep learning feedback loop 800 according to aspects of the present invention will now be described. The server computer 102 selects focus phrases from the corpus of audio phrases 106 and passes them to the PAM 117 which iteratively learns historic performance for individuals and for users with different baseline accents learning various target accents. The server computer 106 uses information from the PAM 117 to select a focus phrase having similarity and learnability scores with a predetermined training range trainable (as described above). The user at block 804 attempts to speak the focus phrase using the target accent. The server computer 106, at block 806 records the user input and passes performance information along to the PAM 117. As this loops progresses, the user is receiving scores on his or her ability to say different phonemes and/or phrases using the target accent. Which each loop of training, the PAM 117 suitable focus phrase prediction accuracy improves.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
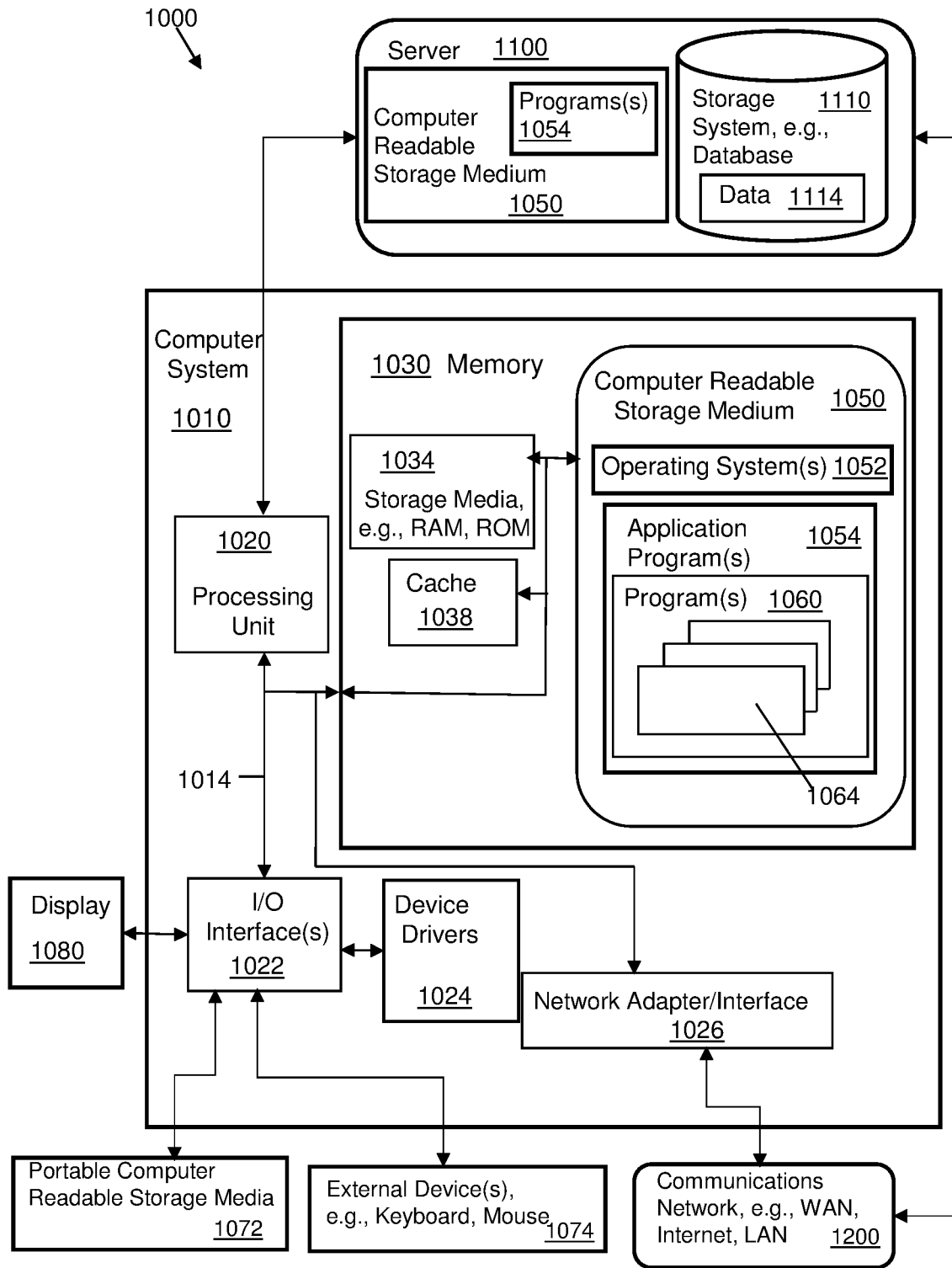
FIG. 9 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 9, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
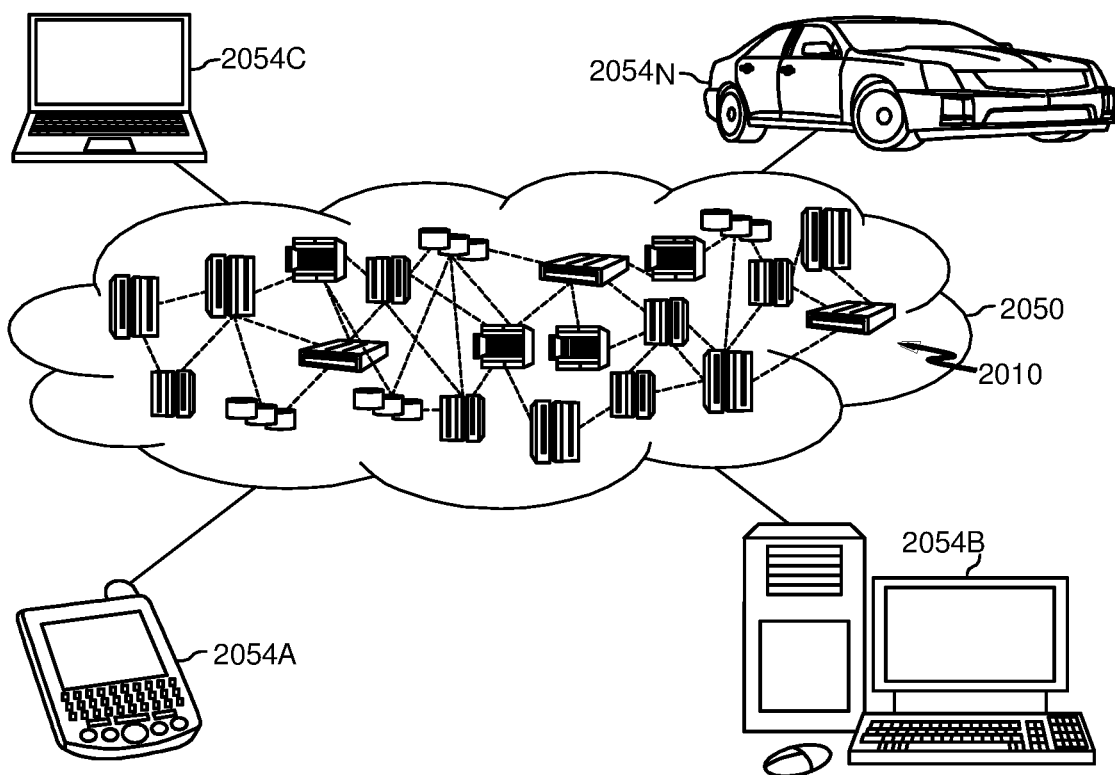
FIG. 10 depicts a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 11:
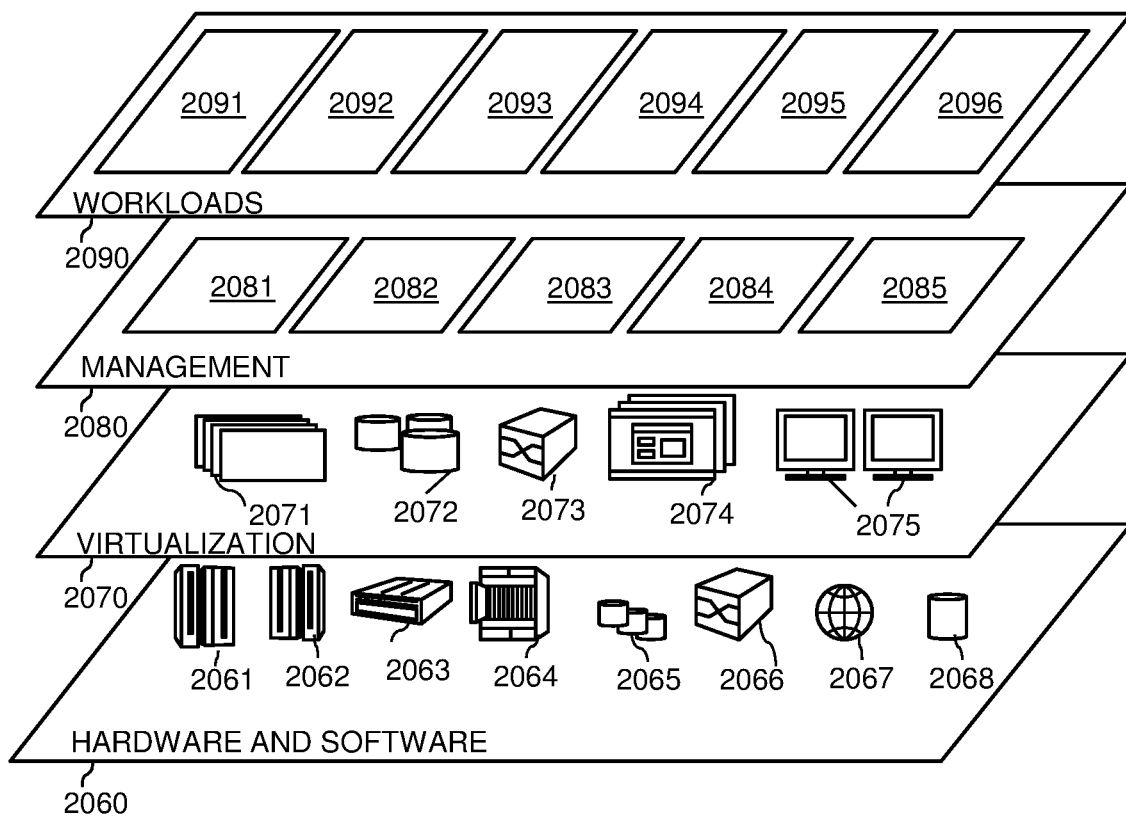
FIG. 11 depicts abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and teaching a user to speak in a target accent 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to train a user to speak with a target accent, comprising:

determining, by a computer, improvable aspects of diagnostic input, received at the computer, the diagnostic input representing a user speaking diagnostic phrases with a target accent;

selecting, by said computer, from a corpus of reference audio phrases received at the computer from a reference audio source, a focus phrase characterized by at least one of said improvable aspects, said focus phrase being selected, in accordance at least in part, with a learnability score calculated, by said computer, using a deep learning machine learning (ML) model trained to assess, for the user, 15 earning difficulty of the improvable aspects;

receiving from an input source, by said computer, performance input representing the user speaking the focus phrase attempting to use the target accent;

converting, by said computer, the performance input into augmented focus output having audio attributes of a baseline voice of the user with the target accent applied thereby generating an accent-corrected version of the baseline voice, and presenting the augmented focus output to the user;

responsive to said presentation, receiving from an input source revised performance input representing the user attempting to replicate the augmented focus output, and determining by said computer, teachable aspects of said revised performance input;

converting, by said computer, selected teachable aspects of the revised performance input into augmented teaching output having at least one audio attribute of the baseline voice of the user with the target accent applied, and presenting, by said computer, the augmented teaching output to the user;

generating similarity scores of the revised performance input based on the revised performance input matching the augmented focus output; and determining when the user is proficient at speaking the focus phrase based on the similarity scores meeting a proficiency threshold for similarity.

2. The method of claim 1, further including receiving an accent assessment speech sample from a speech sample source, representing a user speaking in one of a predetermined set of accents and determining, by said computer, a baseline accent for the user by using a machine learning (ML) accent identification model (AIM) trained to classify the accent assessment speech sample as having one of said predetermined set of accents; and wherein, said learnability score is based, at least partially, on a characteristic selected from a list consisting of said baseline accent and a user performance history of speaking said improvable aspects.

3. The method of claim 2 further including, when said learnability score is chosen in accordance with said baseline accent, said learnability score represents learning difficulty of the improvable aspects for users having the baseline accent and attempting to learn the target accent.

4. The method of claim 1, wherein the focus phrase is characterized by a plurality of improvable attributes identified by said computer, using an ML model trained to determine a difficulty correlation between multiple attributes, as having a learnability score in a predetermined training range.

5. The method of claim 1, wherein said conversion of at least one of said performance input or said selected teachable aspects of the revised performance input is accomplished by said computer using an ML Accent Conversion Model (ACM) trained to convert an audio input into an audio output having the target accent.

6. The method of claim 5, wherein the determination of at least one of said improvable aspects or said teachable aspects is made responsive to said computer using said ACM to convert audio input of the user into an accent-corrected audio file characterized by said target accent and to determine a similarity value indicating an amount of processing needed to convert said audio input into said accent-corrected audio file.

7. The method of claim 1, wherein the plurality of teaching phrases includes at least one phrase provided by the user.

8. A system to train a user to speak with a target accent, which comprises:

a computer system comprising a computer readable storage medium having program instructions embodied therewith, the program instructions executable by a computer to cause the computer to:

determine improvable aspects of diagnostic input, received at the computer, the diagnostic input representing a user speaking diagnostic phrases with a target accent;

select from a corpus of reference audio phrases received at the computer from a reference audio source, a focus phrase characterized by at least one of said improvable aspects, said focus phrase being selected, in accordance at least in part, with a learnability score calculated, by said computer, using a deep learning ML model trained to assess, for the user, learning difficulty of the improvable aspects;

receiving from an input source, performance input representing the user speaking the focus phrase attempting to use the target accent;

convert the performance input into augmented focus output having audio attributes of a baseline voice of the user with the target accent applied thereby generating an accent-corrected version of the baseline voice, and present the augmented focus output to the user;

responsive to said presentation, receiving from an input source revised performance input representing the user attempting to replicate the augmented focus output, and determining by said computer, teachable aspects of said revised performance input;

convert selected teachable aspects of the revised performance input into augmented teaching output having at least one audio attribute of the baseline voice of the user with the target accent applied, and present the augmented teaching output to the user;

generate similarity scores of the revised performance input based on the revised performance input matching the augmented focus output; and determine when the user is proficient at speaking the focus phrase based on the similarity scores meeting a proficiency threshold for similarity.

9. The system of claim 8, further including receiving an accent assessment speech sample from a speech sample source, representing a user speaking in one of a predetermined set of accents and determining, by said computer, a baseline accent for the user by using a machine learning (ML) accent identification model (AIM) trained to classify the accent assessment speech sample as having one of said predetermined set of accents; and wherein, said learnability score is based, at least partially, on a characteristic selected from a list consisting of said baseline accent and a user performance history of speaking said improvable aspects.

10. The system of claim 9, further including, when said learnability score is chosen in accordance with said baseline accent, said learnability score represents learning difficulty of the improvable aspects for users having the baseline accent and attempting to learn the target accent.

11. The system of claim 8, wherein the focus phrase is characterized by a plurality of improvable attributes identified by said computer, using an ML model trained to determine a difficulty correlation between multiple attributes, as having a learnability score in a predetermined training range.

12. The system of claim 8 wherein said conversion of at least one of said performance input or said selected teachable aspects of the revised performance input is accomplished by providing further instruction to said computer to use an ML Accent Conversion Model (ACM) trained to convert an audio input into an audio output having the target accent.

13. The system of claim 12, wherein the determination of at least one of said improvable aspects or said teachable aspects is made responsive to said computer using said ACM to convert audio input of the user into an accent-corrected audio file characterized by said target accent and to determine a similarity value indicating an amount of processing needed to convert said audio input into said accent-corrected audio file.

14. The system of claim 8 wherein the plurality of reference audio phrases includes at least one phrase provided by the user.

15. A computer program product to train a user to speak with a target accent, the computer program product comprising a computer readable storage medium having program instructions embodied therewith, the program instructions executable by a computer to cause the computer to:
determine, using a computer, improvable aspects of diagnostic input, received at the computer, the diagnostic input representing a user speaking diagnostic phrases with a target accent;
select, using the computer, from a corpus of reference audio phrases received at the computer from a reference audio source, a focus phrase characterized by at least one of said improvable aspects, said focus phrase being selected, in accordance at least in part, with a learnability score calculated, by said computer, using a deep learning ML model trained to assess, for the user, learning difficulty of the improvable aspects;
receiving from an input source, using the computer, performance representing of the user speaking the focus phrase attempting to use the target accent;
convert, using the computer, the performance input into augmented focus output having audio attributes of a baseline voice of the user with the target accent applied thereby generating an accent-corrected version of the baseline voice, and present the augmented focus output to the user;
responsive to said presentation, receiving from an input source revised performance input representing the user attempting to replicate the augmented focus output, and determining by said computer, teachable aspects of said revised performance input;
convert, using the computer, selected teachable aspects of the revised performance input into augmented teaching output having at least one audio attribute of the baseline voice of the user with the target accent applied, and presenting the augmented teaching output to the user;
generate similarity scores of the revised performance input based on the revised performance input matching the augmented focus output; and
determine when the user is proficient at speaking the focus phrase based on the similarity scores meeting a proficiency threshold for similarity.

16. The computer program product of claim 15, further including receiving an accent assessment speech sample from a speech sample source, representing a user speaking in one of a predetermined set of accents and determining, by said computer, a baseline accent for the user by using a machine learning (ML) accent identification model (AIM) trained to classify the accent assessment speech sample as having one of said predetermined set of accents; and
wherein, said learnability score is based, at least partially, on a characteristic selected from a list consisting of said baseline accent and a user performance history of speaking said improvable aspects.

17. The computer program product of claim 16, further including, when said learnability score is chosen in accordance with said baseline accent, said learnability score represents learning difficulty of the improvable aspects for users having the baseline accent and attempting to learn the target accent.

18. The computer program product of claim 15, wherein the focus phrase is characterized by a plurality of improvable attributes identified using an ML model trained to determine a difficulty correlation between multiple attributes, as having a learnability score in a predetermined training range.

19. The computer program product of claim 15, wherein said conversion of at least one of said performance input or said selected teachable aspects of the revised performance input is accomplished, using the computer, with an ML Accent Conversion Model (ACM) trained to convert an audio input into an audio output having the target accent.

20. The computer program product of claim 19, wherein the determination of at least one of said improvable aspects or said teachable aspects is made responsive to said computer using said ACM to convert audio input of the user into an accent-corrected audio file characterized by said target accent and to determine a similarity value indicating an amount of processing needed to convert said audio input into said accent-corrected audio file.

* * * * *